United States Patent
Georgy (10) Patent No.: US 9,143,689 B2
(45) Date of Patent: Sep. 22, 2015

(54) STABILIZATION OF A LINE OF SIGHT OF AN ON-BOARD SATELLITE IMAGING SYSTEM

(71) Applicant: ASTRIUM SAS, Suresnes (FR)

(72) Inventor: Pierre-Luc Georgy, Toulouse (FR)

(73) Assignee: Airbus Defence and Space SAS, Les Mureaux (FR)

( * ) Notice: Subject to any disclaimer, the term of this patent is extended or adjusted under 35 U.S.C. 154(b) by 0 days.

(21) Appl. No.: 14/124,362

(22) PCT Filed: May 27, 2013

(86) PCT No.: PCT/FR2013/051176
§ 371 (c)(1),
(2) Date: Dec. 6, 2013

(87) PCT Pub. No.: WO2013/182779
PCT Pub. Date: Dec. 12, 2013

(65) Prior Publication Data
US 2015/0085147 A1    Mar. 26, 2015

(30) Foreign Application Priority Data
Jun. 6, 2012 (FR) ..................... 12 01632

(51) Int. Cl.
*H04N 5/232* (2006.01)
*G02B 27/64* (2006.01)

(52) U.S. Cl.
CPC .......... *H04N 5/23274* (2013.01); *G02B 27/646* (2013.01); *H04N 5/2329* (2013.01); *H04N 5/23254* (2013.01)

(58) Field of Classification Search
CPC ............ H04N 5/23274; H04N 5/2329; H04N 5/23254; G02B 27/646
USPC ....................................... 348/208.2
See application file for complete search history.

(56) References Cited

U.S. PATENT DOCUMENTS

| | | | |
|---|---|---|---|
| 6,154,611 A * | 11/2000 | Washisu | ........... 348/E5.046 |
| 2007/0103556 A1 | 5/2007 | Shimizu | |
| 2008/0186386 A1 | 8/2008 | Okada et al. | |
| 2009/0021588 A1 | 1/2009 | Border et al. | |
| 2012/0321132 A1* | 12/2012 | Ohta | ........... 382/103 |
| 2013/0258106 A1* | 10/2013 | Tulet et al. | ........... 348/145 |

FOREIGN PATENT DOCUMENTS

WO   WO 90/00334 A1   1/1990

OTHER PUBLICATIONS

Simon Baker et al., "Removing Rolling Shutter Wobble", Microsoft Corporation, One Microsoft Way, Redmond, WA 98052, 2010, 8 Pgs.

* cited by examiner

*Primary Examiner* — Gevell Selby
(74) *Attorney, Agent, or Firm* — Patterson Thuente Pedersen, P.A.

(57) ABSTRACT

A method for stabilizing a line of sight of an imaging system on board a satellite uses windows selected within an image sensor. Variations of the line of sight can be characterized at a frequency that is greater than that of a sequential mode of image acquisition by the sensor. The stabilization method can be implemented at the same time as the full-frame acquisition of images by means of the imaging system.

22 Claims, 6 Drawing Sheets

STABILIZATION OF A LINE OF SIGHT OF AN ON-BOARD SATELLITE IMAGING SYSTEM

PRIORITY CLAIM

The present application is a National Phase entry of PCT Application No. PCT/FR2013/051176, filed May 27, 2013, which claims priority from France Application No 10 1201632, filed Jun. 6, 2012, the disclosures of which are hereby incorporated by reference herein in their entirety.

FIELD OF THE INVENTION

The present invention relates to a method for stabilizing a line of sight of an imaging system on-board a satellite. It also relates to an imaging system that is suitable for enabling such stabilization.

BACKGROUND OF THE INVENTION

The use of images that are successively captured from a satellite to detect variations of a line of sight of images is known, and that this line of sight can be corrected to compensate for the variations.

Whenever the line of sight is fixed with respect to the satellite, modifications of the orientation of the entire satellite that are performed to compensate for variations in the line of sight can be used to stabilize the satellite's attitude, that is, it's angular orientation with respect to external markers. In particular, those markers can be imaged in the captured images.

Another application of the stabilization of the line of sight of an imaging system on-board a satellite consists in reducing blur in captured images. This blur is caused by unwanted variations of the line of sight, which occur during exposure of the photodetectors of the image sensor. These unwanted variations may be caused by vibrations produced by moving elements of the satellite, such as attitude control actuators, or a filter wheel, or even fuel in the liquid phase.

In general, the efficiency of stabilization of the line of sight of the imaging system increases when the latency is shorter between the occurrence of a new variation in the line of sight and the moment when the result of the characterization of this variation is obtained. When this latency is short, it is possible to efficiently command the satellite's attitude control system, or a mobile imaging system support, or a variable pointing system, so as to compensate, at least in part, for the variation in the line of sight that has been detected and characterized. In other words, it is then possible to efficiently stabilize the line of sight and provide high responsiveness with respect to its unwanted variations.

Another general object of the methods of line-of-sight stabilization consists in producing successive characterizations of the direction of this line of sight based on a sufficiently high frequency of characterization.

Still another object of the line-of-sight stabilization methods for an imaging system on-board a satellite consists in enabling such stabilization with a high degree of precision. In particular, it is necessary to characterize the variations in the line of sight with a precision greater than that which can be obtained using gyroscopes or star sensors.

Lastly, another object of the invention consists in obtaining improved line-of-sight stabilization that does not require that additional heavy, cumbersome, or costly equipment be placed on-board the satellite. In other words, the invention seeks to improve stabilization of the line of sight by modifying the equipment that is already present on-board the satellite as little as possible.

SUMMARY OF THE INVENTION

To achieve these objects and others, the invention provides a new method of line-of-sight stabilization for an on-board satellite imaging system whenever this imaging system comprises:
- a telescope that is arranged to form an image of a scene in a focal plane, according to the line of sight of the imaging system; and
- at least one matrix image sensor arranged in the focal plane and suitable for capturing successive images in a sequential mode in which photodetectors of the sensor are successively and individually controlled during a phase for accumulating a detection signal for received radiation, followed by a read phase of an accumulated signal, based on a photodetector scan order that is repeated in a continuous loop, each repeated scan of the photodetectors corresponding to a newly captured image, and the read phase for any of the photodetectors is carried out at the same time as the accumulation phase for other photodetectors.

In other words, the image sensor that is used for the method of the invention is suitable for acquiring images in so-called "rolling-shutter" mode, in contrast to the so-called global, or "snapshot," mode during which the detection signal accumulation phase is synchronous for all the photodetectors when acquiring the same image.

In the method of the invention, for several windows, each of which is formed of a different subset of adjacent photodetectors within the sensor, each window being smaller than a total use surface of the sensor, a portion of the image captured in one of the windows during one of the repeated scans of the photodetectors is compared with a reference image content for the same window. Thus, a variation in the line of sight can be characterized between the repeated scan of the photodetectors and a reference scan, and a new characterization of the variation of the line of sight is obtained separately for each window each time the photodetector scan is repeated. Orientation of at least part of the imaging system is then varied so as to modify the line of sight to compensate, at least partially, for the variation of the line of sight that has been characterized.

Thus, the stabilization method of the invention uses the image sensor, which operates in "rolling shutter" mode, so that this sensor is not added specifically to stabilize the line of sight whenever it is already intended to be used for an imaging function, especially a high-resolution imaging function.

Thanks to the use of windows in the sensor for the acquisition of reduced image portions, the total read time of each window is less than the time needed to acquire a complete image with all the sensor's photodetectors. It can be much less than this latter when the window is much smaller than the total area of the sensor that is used for the imaging function. The portion of the image that is acquired in each window for each rolling shutter mode scan is compared to that acquired during a previous scan, but using several different windows allows obtaining comparisons of image portions at the scan frequency of the rolling shutter mode multiplied by the number of windows. Thus, the frequency of characterization of variations in the line of sight is greater, and possibly even much greater, than that of the acquisition of complete images by the sensor.

Moreover, because of the reduced size of the windows, they can be read with a total read time that is short for each window. This is the case, in particular, when the photodetectors of the same window are read consecutively, that is to say, one after the other. The corresponding image portions also constitute reduced data quantities, for which the operations of comparing and correlating the image contents can be achieved rapidly. In other words, the latency between the occurrence of a new variation in the line of sight and the acquisition of the result of its characterization can be short or very short. In this way, stabilization of the line of sight can be highly responsive.

Additionally, variations in the line of sight are characterized by using the same image sensor that is used for the imaging function, which can have very fine resolution. In this way, variations in the line of sight are characterized with high sensitivity and precision.

An advantage of the method of the invention also results from the fact that the characterization of line-of-sight variations can be performed while complete images are being acquired using the sensor, without interruption or disturbance of this imaging function.

Finally, the method of the invention does not require additional components nor any subsequent adaptations of components already provided for the imaging function.

In various embodiments of the invention, the following improvements may be used, separately or in combination with one another:
the same reference image content can be reused for several successive characterizations of the variation of the line of sight that are obtained from the same window, so that a same reference direction can be used for these characterizations;
alternatively, for each new characterization of the variation of the line of sight, the reference image content used for each window may be the image portion that was captured in the same window during the repeated scan of the photodetectors corresponding to the characterization of the line of sight immediately prior to the new characterization. In other words, a direction of the line of sight that results from the prior characterization constitutes a reference direction for the new characterization;
the windows for which the image portions are compared between two repeated scans of the photodetectors may be non-contiguous within the sensor;
the windows for which the image portions are compared between two repeated scans of the photodetectors may correspond to different positions of one same template within the sensor. Windows are then determined by successive translations of the template within the sensor as the scan of the photodetectors proceeds for each image acquired;
a result of each characterization of the variation of the line of sight may be weighted, selected, or rejected based on a content or quality of the image portion that is captured and compared with the content of the reference image for this characterization;
several results of characterizations of line-of-sight variations that were successively obtained for different windows or for different repetitions of photodetector scans may then be filtered with respect to a variation rate of those results;
an average variation of the line of sight may be calculated from several results of characterizations of line-of-sight variations obtained for different windows or for different repetitions of the photodetector scan;
a constant error that may be present in the results of successive characterizations of the variation of the line of sight may be eliminated, for example, by using a Fourier series decomposition. To this purpose, the method of the invention may also comprise the following steps:
calculating the Fourier series decomposition for the results of the successive characterizations of the variation of the line of sight in the form of a sum of components with periodic variations that are associated, respectively, with values of a variation rate of the line of sight;
applying a correction to some amplitudes of those components with periodic variations to reduce variations of those amplitudes to intervals that are limited around multiples of the photodetector scan frequency; then
calculating a Fourier series recomposition from components with periodic variations using amplitudes that were corrected within the intervals limited around the multiples of the photodetector scan frequency, this Fourier series recomposition supplying corrected results for the successive characterizations of the variation of the line of sight;
the repeated scan of the photodetectors to capture successive images may be performed initially at a first frequency for a first period of time, then at a second frequency different from the first frequency during a second period of time, the first and second frequencies being selected so that aliasing distortions that affect the results obtained during each period for the variation of the line of sight are different. In this case, the photodetector scan during one of the first and second periods may be slower than during the other period while using a same number of photodetectors for the sequential mode which is implemented during each of the periods. Alternatively, the scan carried out at the highest frequency may be limited to a first number of image sensor photodetectors, smaller than a second number of image sensor photodetectors that are used for the scan carried out at the lower frequency; and
several matrix image sensors may be arranged in the focal plane to simultaneously capture respective images in the sequential mode that is then implemented separately for each image sensor. In such case, the scan of the photodetectors in sequential mode may advantageously be repeated at a first frequency for a first one of those image sensors and at a second frequency for a second one of them, wherein the first and second frequencies are different and selected so that multiples of the first frequency do not coincide with multiples of the second frequency.

According to a preferred embodiment of the invention, several read channels for the image sensor photodetectors may be provided to operate simultaneously and in parallel. In this way, the frequency of characterization of the line-of-sight variation can be further augmented. For this purpose, the image sensor may comprise at least two separate control and read circuits dedicated, respectively, to complementary parts of the sensor, each of which is formed of a subset of adjacent photodetectors, in such a way that parts of the image are captured, respectively by the sensor parts based on the sequential mode that is implemented separately and simultaneously within them. At least one of the windows is defined within each part of the sensor, and the portions of images that are captured in each window within each part of the sensor are compared between two different repetitions of the scan of the photodetectors for this part of the sensor.

The frequency of characterization of the variation of the line of sight may also be increased by using several image sensors in parallel. For this purpose, separate image sensors may be arranged in the focal plane to simultaneously capture respective images based on the sequential mode implemented separately for each sensor. Portions of the images captured in the windows within each sensor are then compared between two different repetitions of the scan of the photodetectors in this sensor, simultaneously for all the sensors.

For first applications of the invention, including the reduction of image blur, the orientation of at least one part of the imaging system may be changed by varying an orientation of a mobile support of the imaging system with respect to a principal structure of the satellite. Alternatively, an orientation of a variable pointing device that is arranged to adjust the line of sight with respect to the image sensor can be varied equivalently.

For second applications of the invention, including stabilization of satellite attitude, the orientation of the imaging system may be changed by varying the attitude of the satellite and by keeping the line of sight fixed with respect to the satellite.

The invention also proposes an imaging system intended to be loaded on-board a satellite and suitable for stabilizing a line of sight of this imaging system, comprising:

- a telescope that is arranged to form an image of a scene in a focal plane, according to the line of sight of the imaging system;
- at least one matrix image sensor arranged in the focal plane and suitable for capturing successive images in sequential mode; and
- an image comparison unit, suitable for selecting several windows, each of which consists of a different subset of adjacent photodetectors within the sensor, each window being smaller than a total use surface of the sensor, and suitable for comparing a portion of the image acquired in one of the windows during one of the repetitions of the scan of the photodetectors with a reference image content for the same window, so as to characterize a variation of the line of sight between the repetition of the scan of the photodetectors and a reference scan, with a new characterization of the variation of the line of sight obtained separately for each window at each repetition of the scan of the photodetectors; and
- a control unit suitable for controlling a change in orientation of at least part of the imaging system in order to modify the line of sight so as to compensate, at least partially, for its variation.

Such a system is suitable for implementing a method of stabilization such as that described above.

Based on the application of the invention, the control unit may be arranged to control a change in orientation, a displacement, or an operation of at least one piece of a mobile equipment to compensate, at least partially, for the variation in the line of sight. This equipment may be a mobile support of the imaging system that is suitable for varying the orientation of this latter, a variable pointing device for the imaging system arranged to modify the line of sight with respect to the image sensor, or a system for controlling the satellite's attitude and orbit. Possibly, several of these mobile equipment elements can be controlled in combination by the control unit.

BRIEF DESCRIPTION OF THE DRAWINGS

Other features and benefits of the present invention shall appear from the following description of non-limiting embodiments, by referring to the attached drawings, in which.

Figure 3A:
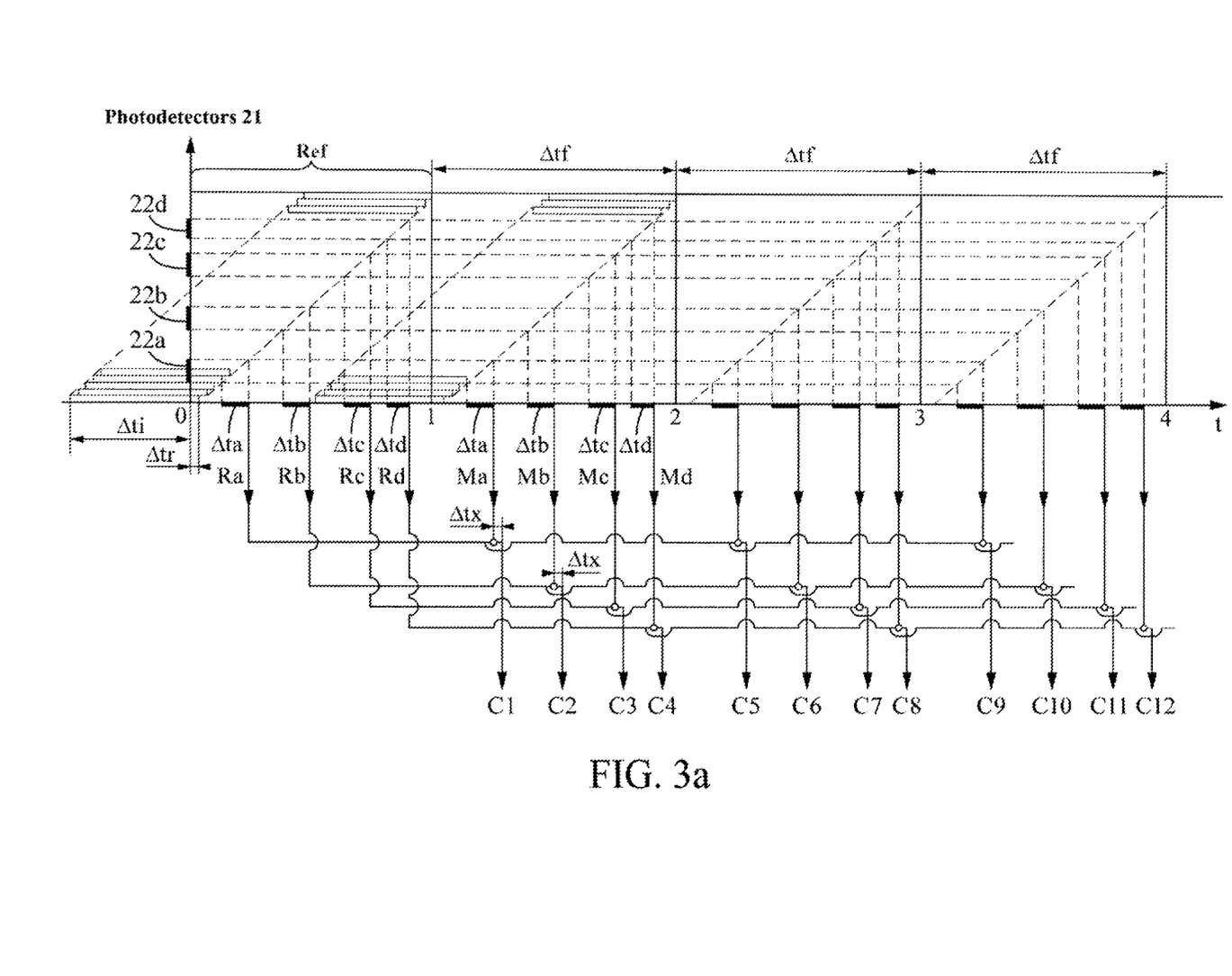
FIG. 3a is a time diagram illustrating a sequence of a method consistent with the invention for characterizing variations in the line of sight.
Figure 3B:
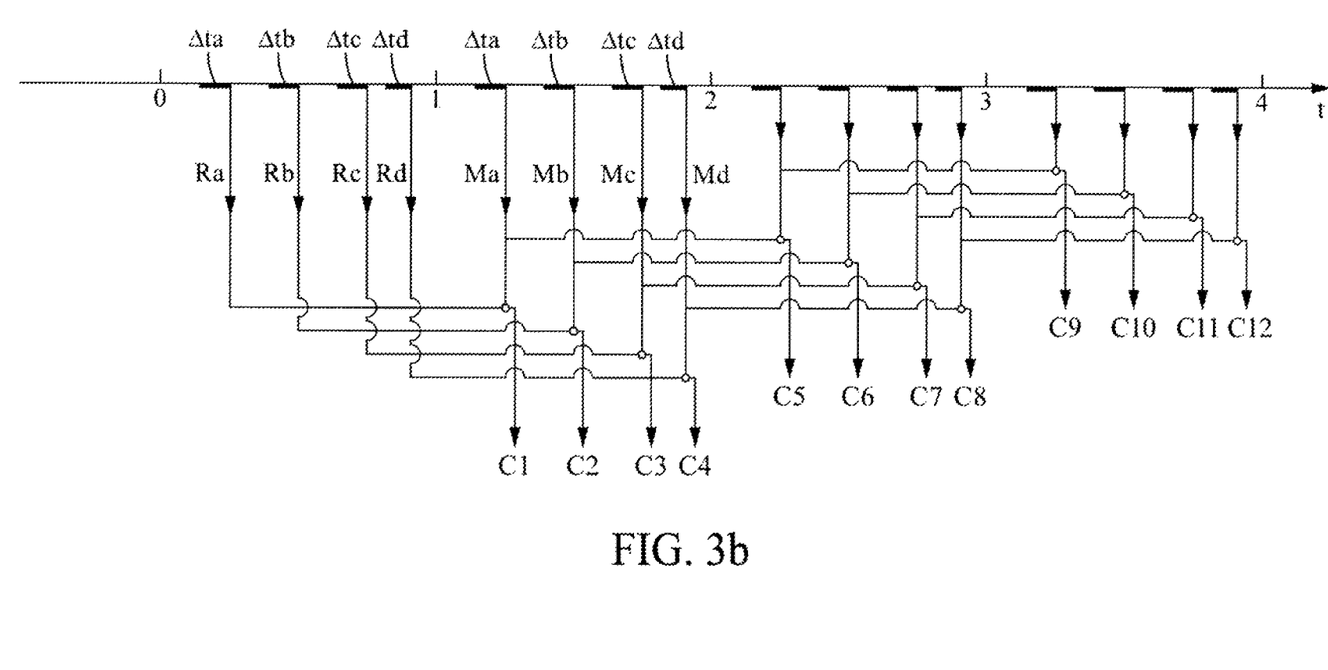
FIG. 3b corresponds to FIG. 3a for a variant method of characterizing variations in the line of sight.

For reasons of clarity, the dimensions of the elements represented in these figures do not correspond to actual dimensions or to ratios of actual dimensions. Additionally, identical reference numbers shown on the different figures refer to identical elements or elements that have identical functions. In FIGS. 3a and 3b, the small empty circles symbolize operations of image content correlation or comparison, which produce the results of characterizing line-of-sight variations.

DETAILED DESCRIPTION OF THE DRAWINGS

Figure 1:
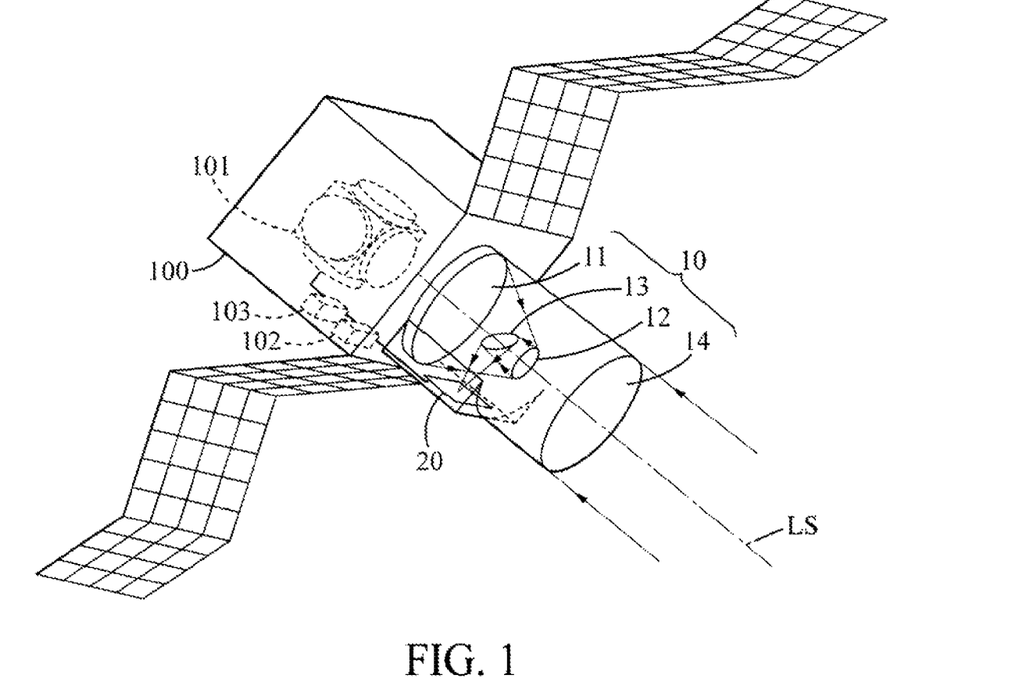
FIG. 1 is a schematic representation of a satellite equipped with an observation telescope to which the invention may be applied.

FIG. 1 symbolically represents a satellite 100, which may be a geostationary satellite or a low-orbit satellite around the Earth. It is equipped with a telescope, 10, for which the line of sight is represented as LS. For illustrative purposes, telescope 10 may have a two-mirror structure: a primary mirror, 11, and a secondary mirror, 12. References 13 and 14 refer, respectively, to a reflecting mirror and the optical entrance of telescope 10. Telescope 10 forms the image of a portion of the surface of the Earth in a focal plane within which an image sensor 20 is arranged. Image sensor 20 is fixed with respect to telescope 10.

The object of the invention consists in efficiently stabilizing the line of sight LS to eliminate or reduce unwanted variations in this line of sight. Such variations can be provoked by vibrations of satellite 100 itself caused, for example, by the residual terrestrial atmosphere at the altitude of satellite 100, or by mobile elements present on board.

When it involves stabilizing line of sight LS for an imaging purpose, for example, it can be appropriate to modify the orientation of telescope 10 with respect to the principle structure of satellite 100 if the telescope is mounted on the structure by means of an orientable mobile support (not shown). Alternatively, at least one variable pointing system of the telescope, which can be a fine pointing system, a coarse pointing system, or a combination of both, can be used to adjust line of sight LS with respect to image sensor 20. The architecture and operation of such pointing systems are known to the skilled practitioner, so it is not necessary to repeat them here.

Finally, telescope 10 may be rigidly fixed to satellite 100 and line of sight LS is directed toward an observation zone on the surface of the Earth by directly adjusting the attitude of the satellite itself. In this case, stabilization of line of sight LS is obtained by directly controlling an operation of the attitude and orbital control system of satellite 100, known by the abbreviation AOCS. Reference 101 refers to a symbolic representation of this AOCS system.

Figure 2A:
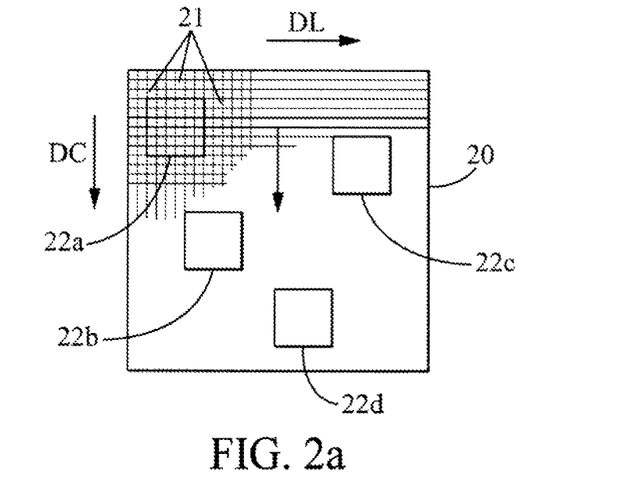
FIGS. 2a and 2b represent, respectively, two image sensors operating in sequential mode, which can be used to implement the invention.

With reference to FIG. 2a, image sensor 20 comprises a matrix of photodetectors, 21, arranged in lines and columns. For example, this image sensor may comprise two thousand photodetectors 21 along its two directions of lines and columns, which are indicated as DL and DC, respectively. Sensor 20 is suitable for capturing images continuously in sequential, or "rolling," mode. Using this particular mode of image acquisition, all photodetectors 21 or a selection of them are read in turn based on a fixed order for scanning the photodetectors, and each new scan corresponds to a newly captured image. Each reading of one of photodetectors 21 is consecutive to a photodetector exposure time during which an electrical signal is accumulated in proportion to a light intensity that is received by this photodetector during the exposure. This behavior may be implemented for imaging purposes, especially for high-definition observation. For example, the rate of image capturing, which is equal to the repetition frequency of the scan of the photodetectors 21, can be of the order of 0.1 Hz (hertz). When the scan traverses all photodetectors 21 of sensor 20, the acquired images are subsequently referred to as "full-frame images," or "full-frame image capture mode."

Reference 102 in FIG. 1 refers to a unit for processing captured images. Its input is connected to a data output of image sensor 20 and its output to a control unit 103 which is suitable for controlling the operation of the mobile equipment used to modify the direction of line of sight LS.

Figure 2B:
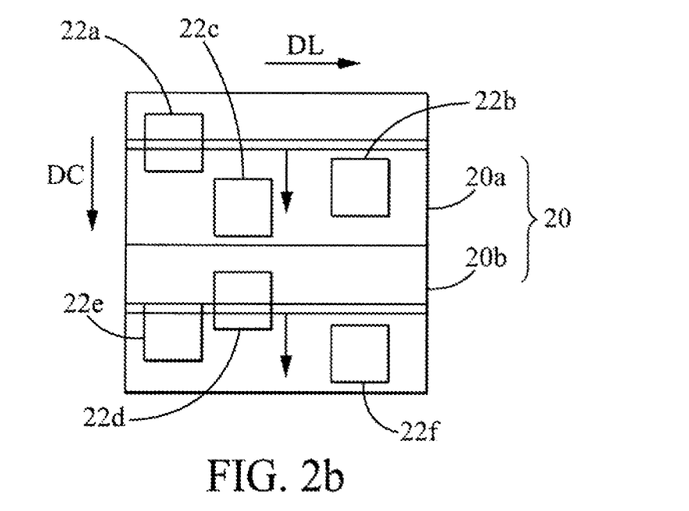

According to a known method, the scan order of photodetectors 21 may be random with respect to the location of each photodetector in matrix 20. The present invention is compatible with any scan order but for reasons of simplifying the illustration, FIGS. 2a and 2b represent a scan or scans that is/are carried out progressively in matrix 20 by following each line along direction DL, then by proceeding to the next line along direction DC. Once the last photodetector 21 of the last line has been read, the scan is resumed without interruption at the first detector of the first line, cyclically.

To implement the invention, several windows are defined in the matrix 20, each of which is formed of adjacent photodetectors 21. Preferably, photodetectors 21 for the same window can be read consecutively, one after the other, during sequential mode scanning, to reduce as much as possible the total time required to read the window. Additionally, image distortion within each window, due to the sequential mode of image acquisition, can also be minimized by such consecutive reading. The same group of windows is used for each repetition of the scan.

The definition or calculation of the windows may be performed by processing unit 102, as well as operations of comparing or correlating image contents acquired during different sequential mode scans.

The windows that are used can be defined in several ways. For example, fixed windows can be identified by the coordinates of photodetectors 21 in the matrix of sensor 20. In this case, they can be separate and distributed regularly throughout the entire use surface of sensor 20. Alternatively, each window can result from a window template of fixed dimensions but which is shifted in the matrix of sensor 20 during scanning Such a method of defining windows can be advantageous when the order of traversing photodetectors 21 in the sequential mode scan for capturing images is otherwise fixed. Each window can be rectangular or square within the matrix and have a smaller, or much smaller, number of photodetectors 21 than the total number of photodetectors in image sensor 20. For example, each window can have 100×100 photodetectors so that the total read time of a window can be 400 times shorter than that of the entire matrix. In FIG. 2a four windows are fixed, which are referenced 22a to 22d.

During the acquisition of a first full-frame image in sequential mode, the content of the image within each window is stored. Then, during each subsequent capture of a new image, the image content of each window is compared to that of the first image captured for the same window. Such comparison can be implemented by using one of the known methods of image correlation. Such methods can involve updating image contents with respect to one another to obtain correlations between image contents at scales that are increasingly finer than the spacing of the photodetectors in the image sensor used. In this way a variation in line of sight LS is determined, based on the variation in the image content of each window, between the first scan and each new scan in sequential image capture mode. In other words, a window that is used in the first image capture is used again in the later image so that the variation in position of the image content in this window between the two scan operations can be used to measure the variation of line of sight LS. The frequency of obtaining a new result of characterizing the variation in line of sight LS is thus equal to the scan repetition frequency in sequential mode multiplied by the number of windows used.

FIG. 3a symbolically illustrates a complete sequence of implementing a method according to the invention. The y-axis identifies all the photodetectors 21 of sensor 20, showing windows 22a-22d. The x-axis identifies the time, shown as t, and each integer value shown on this axis corresponds to an additional scan of all photodetectors 21 in sequential image capture mode. Thus, the scans corresponding to four full-frame images that are successively acquired are shown, and $\Delta tf$ is the duration of each full-frame scan. For each of photodetectors 21, the duration of the accumulation phase is $\Delta ti$ and the duration of the read phase is $\Delta tr$. When photodetectors 21 of each window are read successively, the respective read times of windows 22a-22d are, respectively, $\Delta ta, \ldots, \Delta td$, with $\Delta ta = Na \times \Delta tr$, where Na is the number of photodetectors 21 within window 22a, and similarly for the other windows, 22b-22d. For the first scan of the matrix of sensor 20, a reference image content, indicated Ra, is obtained for window 22a at the end of period $\Delta ta$. Likewise, during this same scan, a reference image content, indicated Rb, is obtained for window 22b at the end of period $\Delta tb$, and similarly for windows 22c and 22d. For the second scan of the matrix of sensor 20, a measurement image content, indicated Ma, is obtained for window 22a at the end of a new period $\Delta ta$ within the acquisition period for the second complete image. Likewise, during this second scan, measurement image contents Mb-Md are also obtained for windows 22a-22d, respectively. When the measurement image content Ma is obtained, it is compared to the reference image content Ra to obtain the first result, C1, of characterizing the variation of line of sight LS. $\Delta tx$ is the processing period needed to obtain result C1 from the two image contents Ra and Ma. Likewise, results C2-C4 of characterizing the variation in line of sight LS are also obtained for each of windows 22b-22d during the second scan of the matrix of sensor 20, and the collection of successive results C5, . . . , C12, . . . is continued identically during subsequent scans. For the method as shown in the lower portion of FIG. 3a, image content Ma, which is obtained during each scan of the matrix of sensor 20 from the second one of those scans, is compared with the same reference image content Ra obtained during the first scan. Likewise, the contents of reference image Rb-Rd are used in an identical manner during each subsequent scan for comparison with the content of measurement image Mb-Md for corresponding window 22b-22d. Thus, the direction of the line of sight corresponding to each portion of reference image Ra-Rd is used as the reference direction for the variations that are characterized subsequently, separately for each window 22a-22d.

Based on a second full-frame image captured by sensor 20, the average frequency of obtaining characterization results for the variation of line of sight LS is the frequency of image acquisition using all the detectors of matrix 20, multiplied by the number N of windows used, that is, N×1/Δtf. Therefore, the invention can be used to characterize the instantaneous direction of line of sight LS with a refresh frequency that can be at least an order of magnitude greater than the frequency of acquiring observation images when more than ten windows are used.

The minimum period needed to obtain a new result for the variation of line of sight LS from an actual variation in the direction of the line of sight is Δta+Δtx for window 22a, with similar expressions for the other windows 22b-22d. This period for each window is currently referred to as the latency period. It is much smaller than that which would result from a characterization of the line of sight based on full-frame images. In the latter case, that is, in using the invention, the latency period would equal the sum of Δtf and the processing period needed to correlate two full-frame images. Typically, the invention can be used to reduce the latency period by more than two orders of magnitude when characterizing the variation of the line of sight.

In initial improvements an embodiment of the invention, at least some of the results of characterizing the variation of line of sight LS can be weighted, selected, or rejected from among the series of all results C1, C2, . . . that are successively obtained. For example, a result that is obtained for a window whose measurement image content is low in contrast can be associated with a low reliability coefficient value or even a zero-value for this coefficient, corresponding to a rejection of the result. This can happen when the image content of the window is a cloudy coverage area on the surface of the Earth or a maritime area. A low value for the reliability coefficient can also be assigned to all the results arising from the same window whose reference image content has low contrast or poor image quality when the first image is captured.

In second improvements an embodiment of the invention, the series of results C1, C2, . . . that are successively obtained for line-of-sight variations LS can be processed in different ways. For example, it can be distributed into successive subsets of results, each subset containing a fixed number of results that have themselves been obtained successively. An average of the results for the variation of the line of sight LS can then be calculated for each subset, possibly by using values of a reliability coefficient that have been determined in accordance with one of the first improvements of the invention. When the number of elementary results in each subset is equal to the number of windows used in the matrix of sensor 20, each average result corresponds to a variation of line of sight LS that is associated with a new full-frame image acquired in sequential mode. Alternatively, the elementary results C1, C2, . . . obtained for the variation of line of sight LS can be filtered successively for all the windows and for the scan repetitions. For example, such filtering can consist in obtaining a moving averaging of a fixed number of elementary results, with a gradual shift in the ordered series of all the elementary results that have been successively obtained. Such filtering is of the low-pass type with respect to the rate of change of results C1, C2, . . . . . Other types of filtering can be applied alternatively, with different filter characteristics.

A third improvement In an embodiment of the invention that is now described can be used to eliminate a constant error that might occur in the successive results C1, C2, . . . obtained for variations of line of sight LS. Such a constant error can occur because the reference directions for line of sight LS that are used for the characterizations made using different windows are themselves different. This difficulty arises from the fact that distinct reference instants are used to establish the reference direction of line of sight LS for each window, and line of sight LS may have changed between those instants. But an error of this type, which affects the series of results C1, C2, . . . , presents a time period that is equal to that of the repeated scan of the matrix of sensor 20 for the sequential mode of image acquisition. It is then possible to eliminate or attenuate this error in several ways, primarily by using Wiener or Kalman filters, or by using a Fourier series decomposition on the succession of elementary results obtained for the variation of line of sight LS. A non-limiting illustration of the principle behind this latter method is now described with reference to FIGS. 4a to 4e. It consists in eliminating the Fourier components whose time frequencies are multiples of that of the repeated scan of photodetectors 21, or of adjusting amplitudes of those components to an average local level by smoothing.

Figure 4A:
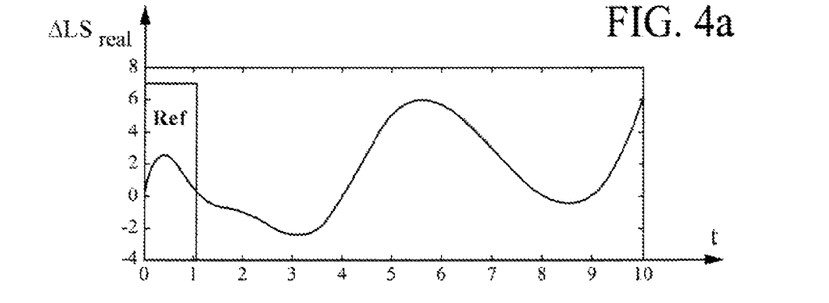
FIGS. 4a to 4e are graphs that illustrate an improvement of the invention to eliminate a constant error in characterizing the line of sight.
Figure 4B:
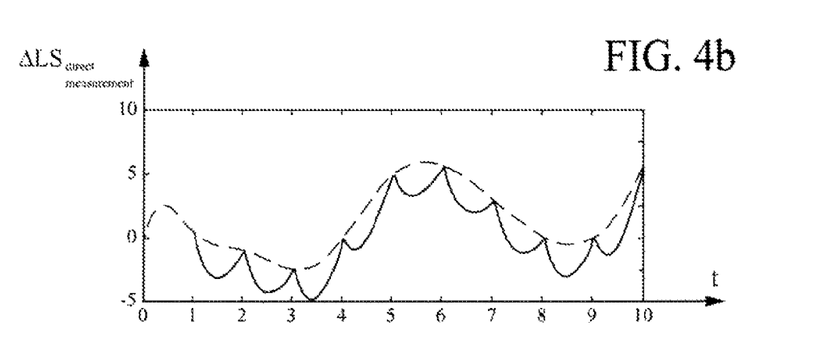
Figure 4C:
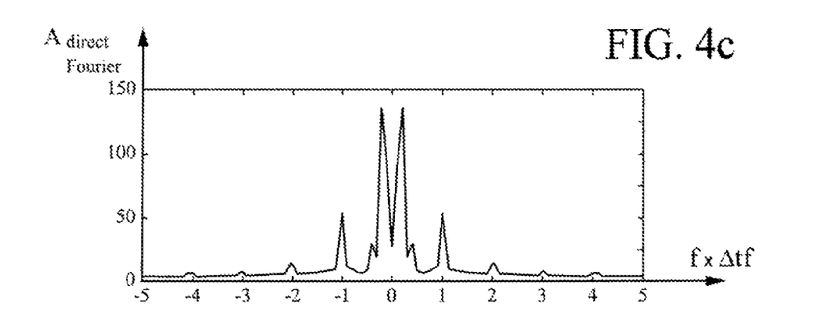
Figure 4D:
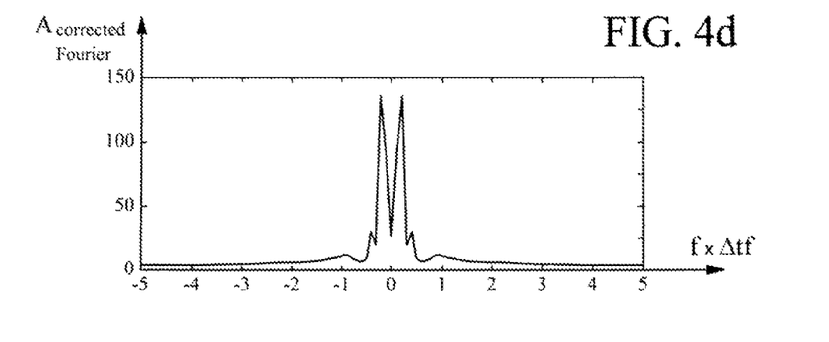
Figure 4E:
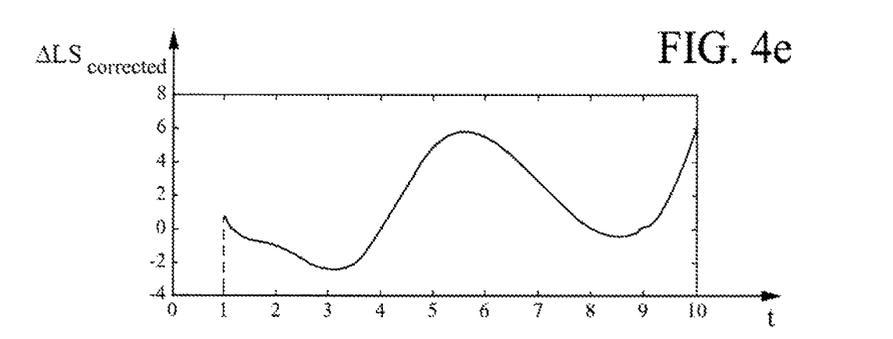

In the diagrams in FIGS. 4a, 4b, and 4e, the x-axis represents the time, t, as in FIG. 3a, by indicating the number of the full-frame image acquired. We assume that the number, N, of windows used is sufficiently large for the curves of diagrams 4b-4e to appear continuous.

The diagram of FIG. 4a schematically represents an example of real variations of line of sight LS, which are indicated as $\Delta LS_{real}$ along the y-axis. These variations are shown for a single coordinate in the diagrams in FIGS. 4a-4e to simplify visualization, it being understood that they actually correspond to two separate angular coordinates.

The frame shown as Ref in FIG. 4a corresponds to the acquisition of the first image, whose image contents inside the windows are used later as reference image contents.

The curve shown as a solid line in the diagram in FIG. 4b connects the results C1, C2, . . . obtained for the variation of line of sight LS by using the sequence of the method of FIG. 3a. These results, which are identified on the y-axis as $\Delta LS_{direct\ measurement}$, are derived directly from comparisons between each measurement image content acquired during a later scan and the corresponding reference image content acquired during the acquisition scan of the first Ref image. The actual displacement of line of sight LS that occurs during this first Ref scan thus appears in inverse form as a constant error in all successive results of line-of-sight characterization. This constant error has a time period equal to time Δtf of the scan of the complete frame of detector 20. The curve shown as a dashed line in the diagram in FIG. 4b is taken from FIG. 4a, for it constitutes the basis for variations of the line of sight that are calculated, onto which the systematic error is superimposed.

The diagram in FIG. 4c represents amplitudes $A_{direct\ Fourier}$ of the components of the Fourier decomposition for variations that have been calculated for line of sight LS, as shown by the continuous line curve in FIG. 4b. The x-axis in the diagram is, therefore, a time frequency, which is determined in multiples of the scan frequency 1/Δtf in sequential mode. Components whose frequencies are located near the zero frequency correspond to the actual variation of line of sight LS during successive scans in sequential mode. But components whose frequencies are multiples of 1/Δtf correspond to repeated reuse of variations of the line of sight that occurred during the acquisition scan of the first Ref image due to successive reuse of the contents of the reference image for correlation with the contents of the measurement images.

The curve whose amplitudes are Fourier components is then smoothed, as shown in the diagram in FIG. 4d. Smoothing is limited to within frequency intervals that extend around successive multiples of 1/Δtf, and the amplitudes of Fourier components that are thus modified are repeated on the axis indicated as $A_{corrected\ Fourier}$. By interval around each multiple of $1/\Delta tf$, we mean, for example, an interval that extends to at least $0.2/\Delta tf$, or less than $0.1/\Delta tf$ on either side of the multiple of $1/\Delta tf$.

We then calculate an inverse Fourier decomposition, or recomposition, from the smoothed amplitudes of Fourier components. The diagram in FIG. 4e illustrates the result of this recomposition, indicated as $\Delta LS_{corrected}$: measured variations of the line of sight that have been filtered reproduce the actual variations of FIG. 4a without the error due to displacement of the line of sight during the acquisition scan of the first Ref image.

A fourth improvement An embodiment of the invention is used to detect components of the actual variation of line of sight LS whose frequencies are multiples of that of the sequential mode scan during image acquisition. In principle, these components cannot be detected by using a sampling that is limited by the frequency of repetition of sequential mode scanning To overcome this limitation, we intentionally change the scan repetition frequency in sequential mode between two series of successive images. For example, sequential mode image acquisition is carried out during a first imaging period at the maximum frequency permitted by image sensor 20 in full-frame operation, corresponding to the use of all the photodetectors. Image acquisition can then be carried out during a second imaging period by increasing the duration of a full-frame scan to a value that is greater than $\Delta tf$. Thus, the frequencies for which variations in the line of sight cannot be detected are different between the two imaging periods. If a component having a periodic variation of the line of sight extends, at least in part, over two imaging periods, it is then necessarily detected during at least one of the two imaging periods. The duration of a full-frame scan can be increased, for example, by intentionally introducing delays in the sequence of accumulation and read phases that are carried out for the photodetectors during scanning, without modifying the number of photodetectors used. Alternatively, the effective duration of a sequential mode scan can be reduced by reducing the number of photodetectors that are used during a scan while maintaining a constant rate for reading the photodetectors. For example, a reduced number of photodetectors is used for the images that are acquired during the second imaging period, so that the frequency of sequential mode scanning is higher for the second imaging period than the frequency used for the first imaging period. In particular, the photodetectors used during the second imaging period can be limited to a specific number of columns of image sensor 20, counted progressively from an edge of this sensor. The windows used during the second imaging period are then also found inside this set of columns. Mathematically, this fourth improvement consists in modifying the sequential mode scanning frequency so that the aliasing that results from measurement sampling of variations of the line of sight is different for the two imaging periods.

When several distinct imaging sensors are used in the focal plane, for example, to capture an image simultaneously and respectively of scene elements contained in different parts of the field of view, the fourth improvement of the invention can also be implemented by modifying the read frequency between at least some of the sensors. In this way the frequencies for which variations in the line of sight cannot be detected, because they coincide with multiples of scan repetition frequencies in sequential mode, differ from one sensor to another. In other words, one of the image sensors fills in the spectral deficiency of another sensor to reconstitute the whole set of possible frequency values for variations of the line of sight by joining spectral intervals in which each of the sensors is effective. For example, the scan repetition frequency in sequential mode can initially be 5 Hz (hertz) for all the image sensors but, for one of the sensors, a 50 ms (millisecond) pause can be introduced after each complete scan of its photodetectors. For this sensor, the apparent scan repetition frequency in sequential mode becomes 4 Hz, whereas it remains equal to 5 Hz for the other sensor(s).

Alternatively, in the fourth improvement this embodiment of the invention that has just been described, the components of the variation of line of sight LS that have frequencies that are multiples of the scan frequency in the sequential mode of image capture, can be determined by using means other than those of the imaging system. For example, the amplitudes of these components can be determined from measurements made using inertial sensors of satellite 100, such as gyroscopes, or by using star sensors. The results of such complementary measurements can be combined with those obtained using the imaging system according to the invention.

In the sequence of the method represented in FIG. 3a, the same image content acquired during the first Ref scan is reused during each later scan to compare the contents of the measurement image, which are read successively, with the contents of the reference image resulting from the first scan, for each window. FIG. 3b corresponds to the lower part of FIG. 3a for a variant embodiment of the invention, and the same notations are used. According to the variant of FIG. 3b, during each new scan repetition in sequential mode, the image content of each window is compared to that obtained for the same window during the preceding scan repetition. In other words, each image content that is read during a sequential mode image acquisition scan for one of the windows serves as the content of the reference image for the same window when characterizing the line of sight that results from the next scan.

FIG. 2b corresponds to FIG. 2a for another variant embodiment of the invention. According to this other variant, image sensor 20 is equipped with several, for example, two, photodetector control and read circuits, each of which is dedicated to a complementary part of sensor 20. Thus, the photodetectors of a first half 20a of the use surface of sensor 20 are controlled and read by a first circuit (not shown) and those of a second half 20b of the use surface are controlled and read by a second circuit (also not shown), separate from the first one. The parallel use of several control and read circuits in combination with the same photodetector matrix is well known to the skilled practitioner. Sequential mode image acquisition functions can then be carried out in parallel and simultaneously in each half of sensor 20a, 20b so that the total acquisition time of a full-frame image is divided by two. The method of the invention can them be implemented within each half of sensor 20a, 20b by using at least one window within each of them. Thus, windows 22a-22c are situated in half 20a of image sensor 20 and sensors 22d-22f are situated in half 20b of the same sensor. This variant of the invention allows the maximum frequency of line-of-sight LS variations that can be measured to be doubled.

According to yet another variant embodiment of the invention, whose object is also to increase the maximum frequency of line-of-sight variations that can be measured, image sensor 20 can be replaced by several independent sensors that are placed in the focal plane of telescope 10. By several independent sensors we mean matrix sensors of the type found in FIG. 2a and which have respective and separate photodetector matrices. The results of characterizations of the variation of the line of sight that are obtained from images acquired by different sensors are gathered in a unique series ordered chronologically, which can be processed as described above.

For the two variants with several control and read circuits associated with the same sensor and several independent sensors arranged in the focal plane, the windows are selected preferably from the interior of each sensor part or each sensor so all are read at different times. In this way, greater precision can be obtained in characterizing variations of the line of sight based on the group of windows thus selected. Additionally, these two variants can be combined with any of the four improvements that have been described or several of them. In particular, the variant embodiment illustrated by FIG. 3b may present a constant error that affects successive characterizations of the variation of the line of sight, similar to that found in the embodiment of FIG. 3a. It can then be eliminated in the same way by using the third improvement described.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. Method for stabilizing a line of sight of an imaging system on-board a satellite, said imaging system comprising:
    a telescope arranged to form an image of a scene in a focal plane, according to the line of sight of the imaging system; and
    at least one matrix image sensor arranged in the focal plane and suitable for capturing successive images in a sequential mode, in which photodetectors of the sensor are successively and individually controlled during an accumulation phase of a detection signal for received radiation, followed by a read phase of an accumulated signal, based on an order for scanning the photodetectors that is repeated in a continuous loop, each repetition of scan of the photodetectors corresponding to a newly captured image, and the read phase for any of the photodetectors being carried out at the same time as the accumulation phase for other ones of the photodetectors;
wherein, for several windows, each of which consists of a different subset of adjacent photodetectors within the sensor, each window being smaller than a total use surface of the sensor, an image portion captured in one of the windows during one of the repetitions of the scan of the photodetectors is compared with a reference image content for the same window, so as to characterize a variation of the line of sight between said repetition of the scan of photodetectors and a reference scan, and a new characterization of the variation of the line of sight being obtained separately for each window at each repetition of the scan of the photodetectors;
and wherein an orientation of at least part of the imaging system is changed so as to modify the line of sight to compensate, at least partially, for the variation of said line of sight.

2. The method according to claim 1, wherein the same reference image content is reused for several successive characterizations of the variation of the line of sight obtained from one of said windows, so that one and same reference direction is used for said characterizations of the variation of the line of sight.

3. The method according to claim 1, wherein for each new characterization of the variation of the line of sight, the reference image content used for each window is the image portion that was acquired in the same window during the repeated scan of the photodetectors corresponding to the characterization of the line of sight immediately prior to said new characterization, so that a direction of the line of sight resulting from the prior characterization constitutes a reference direction for the new characterization.

4. The method according to claim 1, wherein the windows for which the image portions are compared between two repetitions of the scan of the photodetectors are separated within the sensor.

5. The method according to claim 1, wherein the windows for which the image portions are compared between two repetitions of the scan of the photodetectors correspond to different positions of a same template within the sensor, and wherein the windows are determined by successive translations of the template within the sensor as the scan of the photodetectors proceeds for each captured image.

6. The method according to claim 1, wherein the image sensor comprises at least two separate control and read circuits dedicated, respectively, to complementary parts of the sensor, each of which is formed of a subset of adjacent photodetectors, in such a way that parts of the image are acquired, respectively, by parts of the sensor using the sequential mode that is implemented separately and simultaneously within said parts of the sensor,
    at least one of the windows being defined inside each part of the sensor,
    and wherein the portions of images that are captured in each window within each part of the sensor are compared between two different repetitions of scan of the photodetectors of said part of the sensor.

7. The method according to claim 1, wherein several separate image sensors are arranged in the focal plane so as to simultaneously acquire respective images in the sequential mode implemented separately for each sensor,
    and wherein portions of images captured in windows inside each sensor are compared between two different repetitions of the scan of the photodetectors of said sensor, simultaneously for said several sensors.

8. The method according to claim 1, wherein a result of each characterization of the variation of the line of sight is weighted, selected, or rejected based on a content or quality of the image portion that is captured and compared with the content of the reference image for said characterization.

9. The method according to claim 1, wherein several results of characterizations of line-of-sight variations that were successively obtained for different windows or for different repetitions of the scan of the photodetectors are then filtered with respect to a rate of variation of said results.

10. The method according to claim 1, wherein an average variation of the line-of-sight is calculated from several results of characterizations of variations of the line of sight obtained for different windows or for different repetitions of the scan of the photodetectors.

11. The method according to claim 1, also comprising the following steps:
    calculating a Fourier series decomposition for results of successive characterizations of the variation in the line of sight, in form of a sum of components with periodic variations associated respectively with values of a variation rate of the line of sight;

applying a correction to certain amplitudes of the components with periodic variations, to reduce variations of said amplitudes within limited intervals around multiples of the photodetector scan frequency; then calculating a Fourier series recomposition from the components with periodic variations using the amplitudes that were corrected within the limited intervals around the multiples of the photodetector scan frequency, said Fourier series recomposition supplying corrected results for the successive characterizations of the variation of the line of sight.

12. The method according to claim 1, wherein the repeated scan of the photodetectors to capture the successive images is performed initially at a first frequency for a first period of time, then at a second frequency different from the first frequency for a second period of time, the first and second frequencies being selected so that aliasing distortions that affect the results obtained during each period for the variation of the line of sight (LS) are different.

13. The method according to claim 12, wherein the photodetector scan during one of the first and second time periods is slower than during the other one of said periods, while using the same number of photodetectors for the sequential mode that is implemented during each of said periods.

14. The method according to claim 12, wherein the scan carried out at the highest frequency is limited to a first number of photodetectors of the image sensor, smaller than a second number of photodetectors of said image sensor used for the scanning carried out at the lowest frequency.

15. The method according to claim 1, wherein several matrix image sensors are arranged in the focal plane to simultaneously capture respective images in the sequential mode implemented separately for each image sensor, and wherein the scan of the photodetectors in the sequential mode is repeated at a first frequency for a first one of said image sensors and at a second frequency for a second one of said image sensors, first and second frequencies being different and selected so that multiples of the first frequency do not coincide with multiples of the second frequency.

16. The method according to claim 1, wherein the orientation of the part of the imaging system is changed by varying an orientation of a mobile support of said imaging system with respect to a principal structure of the satellite, or by varying an orientation of a variable pointing device arranged to adjust the line of sight (LS) with respect to the image sensor.

17. The method according to claim 1, wherein the orientation of the imaging system is changed by varying an attitude of the satellite and by keeping the line of sight fixed with respect to the satellite.

18. An imaging system intended to be placed on board a satellite and suitable for stabilizing a line of sight of said imaging system, comprising:

a telescope arranged to form an image of a scene in a focal plane, according to the line of sight of the imaging system;

at least one matrix image sensor arranged in the focal plane and suitable for capturing successive images in a sequential mode, in which photodetectors of the sensor are successively and individually controlled during an accumulation phase of a detection signal for received radiation, followed by a read phase of an accumulated signal, based on an order for scanning the photodetectors that is repeated continuously in a loop, each repetition of scan of the photodetectors corresponding to a newly captured image, and the read phase for any of the photodetectors being carried out at the same time as the accumulation phase for other ones of the photodetectors; and an image comparison unit, which is suitable for selecting several windows each of which consists of a different subset of adjacent photodetectors within the sensor, each window being smaller than a total use surface of the sensor, and suitable for comparing a portion of the image captured in one of the windows during one of the repetitions of the scan of the photodetectors with a reference image content for the same window, so as to characterize a variation of the line of sight between said repetition of the scan of the photodetectors and a reference scan, and suitable for obtaining a new characterization of the variation of the line of sight separately for each window at each repetition of the scan of the photodetectors; and a control unit suitable for controlling a change in an orientation of at least part of the imaging system so as to modify the line of sight to compensate, at least partially, for the variation of said line of sight.

19. The system according to claim 18, suitable for implementing a method according to claim 1.

20. The system according to claim 18, also comprising a mobile support of the imaging system arranged to vary an orientation of said imaging system, and wherein the control unit is arranged to control a change of orientation of the mobile support so as to modify the line of sight to compensate, at least partially, for the variation of said line of sight.

21. The system according to claim 18, also comprising a variable pointing device arranged to modify the line of sight with respect to the image sensor, and wherein the control unit is arranged to control a displacement of the variable pointing device in order to compensate, at least partially, for the variation of said line of sight.

22. The system according to claim 18, in which the control unit is suitable for controlling an operation of an attitude and orbit control system of the satellite, so as to vary the satellite's attitude in order to compensate, at least partially, for the variation of the line of sight.

* * * * *